US008162732B1

(12) United States Patent
Juds et al.

(10) Patent No.: US 8,162,732 B1
(45) Date of Patent: Apr. 24, 2012

(54) DISPLAY DEVICE, SYSTEM AND METHODS FOR A CRAPS TABLE

(75) Inventors: Scott M. Juds, Seattle, WA (US); James H. Halsey, El Dorado, AR (US)

(73) Assignee: IDX, Inc., El Dorado, AR (US)

( * ) Notice: Subject to any disclaimer, the term of this patent is extended or adjusted under 35 U.S.C. 154(b) by 957 days.

(21) Appl. No.: 11/744,212

(22) Filed: May 3, 2007

Related U.S. Application Data

(60) Provisional application No. 60/797,777, filed on May 3, 2006.

(51) Int. Cl.
*A63F 9/04* (2006.01)
*A63F 13/00* (2006.01)

(52) U.S. Cl. .......... 463/10; 463/31

(58) Field of Classification Search .......... 463/10, 463/31
See application file for complete search history.

(56) References Cited

U.S. PATENT DOCUMENTS

| | | | | | |
|---|---|---|---|---|---|
| 4,339,798 | A | * | 7/1982 | Hedges et al. | 463/26 |
| 4,744,098 | A | | 5/1988 | Grabowski | |
| 4,912,681 | A | | 3/1990 | Halsey et al. | |
| 4,976,346 | A | | 12/1990 | Juds et al. | |
| 4,998,612 | A | | 3/1991 | Halsey et al. | |
| 5,042,810 | A | | 8/1991 | Williams | |
| 5,046,841 | A | | 9/1991 | Juds et al. | |
| 5,121,824 | A | | 6/1992 | Halsey et al. | |
| 5,129,501 | A | | 7/1992 | Halsey et al. | |
| 5,211,275 | A | | 5/1993 | Halsey et al. | |
| 5,371,681 | A | | 12/1994 | Juds et al. | |
| 5,410,444 | A | | 4/1995 | Juds | |
| 5,487,547 | A | * | 1/1996 | Hobert | 273/274 |
| 5,490,670 | A | * | 2/1996 | Hobert | 463/20 |
| D371,579 | S | * | 7/1996 | Hanscom | D21/327 |
| 5,586,684 | A | | 12/1996 | Halsey et al. | |
| 5,660,304 | A | | 8/1997 | Halsey et al. | |
| 5,728,002 | A | * | 3/1998 | Hobert | 463/17 |
| 5,788,240 | A | * | 8/1998 | Feinberg | 273/274 |
| 5,829,749 | A | * | 11/1998 | Hobert | 273/274 |
| 5,836,583 | A | | 11/1998 | Towers | |
| 5,934,676 | A | * | 8/1999 | Rubin | 273/309 |
| 6,021,881 | A | | 2/2000 | Wild | |
| 6,021,882 | A | | 2/2000 | Juds et al. | |
| 6,112,876 | A | | 9/2000 | Juds et al. | |
| 6,464,225 | B1 | * | 10/2002 | Webb | 273/274 |

(Continued)

OTHER PUBLICATIONS

TCS ACES—Casino Products—"Animator" Roulette Winning Number Display: http://web.archive.org/web/20060208085250/ http://www.tcsaces.com/products/displays/display_roulette.htm.

(Continued)

*Primary Examiner* — David L Lewis
*Assistant Examiner* — William H McCullogh, Jr.
(74) *Attorney, Agent, or Firm* — Speed Law Firm

(57) ABSTRACT

A device, system and method for display for a craps table. In one example, a display may include a display portion operable to display a representation of data relating to a current die pair rolled by a shooter; and a display portion operable to display a representation of data relating to previous die pairs rolled. In one example, the representation of the data relating to the current die pair includes a graphic representation of the face of each die of the current die pair. A display may also include a display portion operable to display an indicator of a current point value of the craps game. Other features and embodiments are disclosed herein.

33 Claims, 14 Drawing Sheets

U.S. PATENT DOCUMENTS

| | | | | |
|---|---|---|---|---|
| 6,564,997 | B1 | 5/2003 | Juds | |
| 6,652,378 | B2 * | 11/2003 | Cannon et al. | 463/20 |
| 6,860,810 | B2 * | 3/2005 | Cannon et al. | 463/20 |
| 6,896,614 | B2 * | 5/2005 | Romero | 463/12 |
| 6,926,277 | B2 * | 8/2005 | Auricchio | 273/274 |
| 7,081,050 | B2 * | 7/2006 | Tarantino | 463/22 |
| 7,144,324 | B2 * | 12/2006 | Yarbrough et al. | 463/46 |
| 7,201,656 | B2 * | 4/2007 | Darder | 463/16 |
| 7,264,169 | B2 | 9/2007 | Juds | |
| 7,268,688 | B2 | 9/2007 | Juds | |
| 7,299,109 | B2 | 11/2007 | Juds et al. | |
| 7,370,798 | B2 | 5/2008 | Juds | |
| 7,520,507 | B2 * | 4/2009 | Gak | 273/146 |
| 7,533,885 | B2 * | 5/2009 | Nicely et al. | 273/142 R |
| 7,553,233 | B2 * | 6/2009 | Jarvis et al. | 463/42 |
| D598,958 | S * | 8/2009 | O'Halloran et al. | D21/369 |
| 7,669,854 | B1 * | 3/2010 | Thompson et al. | 273/274 |
| 7,674,172 | B2 * | 3/2010 | Miltenberger et al. | 463/17 |
| 7,686,305 | B2 * | 3/2010 | Stasi | 273/274 |
| 7,708,630 | B2 * | 5/2010 | Nicely | 463/17 |
| 7,708,636 | B2 * | 5/2010 | Asher et al. | 463/22 |
| 7,811,165 | B2 * | 10/2010 | Slomiany et al. | 463/16 |
| 7,857,696 | B2 * | 12/2010 | Tarantino | 463/24 |
| 7,997,973 | B2 * | 8/2011 | Lutnick et al. | 463/16 |
| 7,997,984 | B2 * | 8/2011 | Morgan et al. | 463/31 |
| 2001/0034264 | A1 * | 10/2001 | Berman et al. | 463/22 |
| 2001/0035604 | A1 * | 11/2001 | Jones | 273/139 |
| 2001/0055989 | A1 * | 12/2001 | Thomas | 463/16 |
| 2002/0042298 | A1 * | 4/2002 | Soltys et al. | 463/29 |
| 2002/0042299 | A1 * | 4/2002 | Soltys et al. | 463/29 |
| 2002/0084587 | A1 * | 7/2002 | Bennett et al. | 273/309 |
| 2002/0111205 | A1 * | 8/2002 | Beavers | 463/12 |
| 2002/0111213 | A1 * | 8/2002 | McEntee et al. | 463/42 |
| 2002/0196342 | A1 * | 12/2002 | Walker et al. | 348/157 |
| 2003/0078103 | A1 * | 4/2003 | LeMay et al. | 463/43 |
| 2003/0109306 | A1 * | 6/2003 | Karmarkar | 463/40 |
| 2003/0109310 | A1 * | 6/2003 | Heaton et al. | 463/42 |
| 2004/0002376 | A1 * | 1/2004 | Swift et al. | 463/25 |
| 2004/0014521 | A1 * | 1/2004 | Seelig et al. | 463/20 |
| 2004/0102245 | A1 * | 5/2004 | Escalera et al. | 463/32 |
| 2005/0061606 | A1 | 3/2005 | Juds | |
| 2006/0252534 | A1 * | 11/2006 | Walker et al. | 463/31 |
| 2007/0026916 | A1 | 2/2007 | Juds | |
| 2007/0060310 | A1 | 3/2007 | Juds et al. | |
| 2007/0060326 | A1 | 3/2007 | Juds et al. | |
| 2008/0128990 | A1 * | 6/2008 | Lowery | 273/274 |
| 2008/0153567 | A1 | 6/2008 | Juds et al. | |
| 2008/0217851 | A1 * | 9/2008 | Colton | 273/274 |
| 2008/0274808 | A1 * | 11/2008 | Walker et al. | 463/31 |
| 2010/0203965 | A1 * | 8/2010 | Juds et al. | 463/31 |

OTHER PUBLICATIONS

GammaTek Roulette Displays—GammaTek Table Game Displays: http://www.gammatek.com/prod01.htm.
Cammegh—The World's Finest Roulette Wheel—Matrix 2: http://web.archive.org/web/20070322192152/http://www.cammegh.com/displays.htm.
TCSJOHNHUXLEY—Animator Display: http://web.archive.org/web/20071019035604/http://www.tcsjohnhuxley.com/products/LIVEGAMING/Displays/AnimatorDisplay/en.
SET—Production—Display for American Roulette with Video Reader Cyclops Multimedia: http://www.ecla.setproduction.ru/en/cyclop_el.html.
Basic Craps: http://www.gamblingtimes.com/bascraps.html.
Craps Rules: http://www.casino4you.com/Rules/craps.htm.
Dice Play—Basic Craps: http://homepage.ntlworld.com/dice-play/CrapsBasic.htm.

* cited by examiner

140

DISPLAY DEVICE, SYSTEM AND METHODS FOR A CRAPS TABLE

CROSS REFERENCE TO RELATED APPLICATION

This application claims the benefit under 35 U.S.C. §119 (e) of U.S. Provisional Patent application No. 60/797,777 filed May 3, 2006 entitled “DISPLAY DEVICE, SYSTEM AND METHODS FOR A CRAPS TABLE,” the disclosure of which is hereby incorporated by reference herein in its entirety.

FIELD OF THE INVENTION

The Present invention relates generally to electronic displays.

BACKGROUND OF THE INVENTION

A craps game is a popular casino game involving a craps table and a shooter who rolls a pair of dice. Based on the outcome of each roll made by the shooter and the current “point,” certain payouts or events can occur. The game’s administrative staff for a craps game can include a box man, two dealers, and a stick man, the stick man charged with gathering the dice after they have been rolled and returning them to the shooter.

The two dealers take bets and put them on a layout in pre-designated spots on the craps table, collecting losing bets and paying out winning bets. The box man oversees the game to make sure it is properly conducted. The stick man stands at the middle of the table opposite the box man and dealers, and holds a long stick with a hook end. With the stick, the stick man collects the pair of dice and moves them to the shooter.

As recognized by the present inventors, what is needed is a display for a craps table which provides historical data which a player or an observer can easily read and understand.

It is against this background that various embodiments of the present invention were developed.

SUMMARY

In light of the above and according to one broad aspect of one embodiment of the present invention, disclosed herein is a display for a craps table that displays historical data of dice that have been rolled.

In one example, the display may include a display portion operable to display a representation of data relating to a current die pair rolled by a shooter; and a display portion operable to display a representation of data relating to previous die pairs rolled. In one example, the representation of the data relating to the current die pair includes a graphic representation of the face of each die of the current die pair. A display may also include a display portion operable to display an indicator of a current point value of the craps game.

In one embodiment, a display may also include one or more indicators indicating a winning die pair; and/or one or more indicators indicating a change in a shooter.

According to another broad aspect of another embodiment of the present invention, disclosed herein is a system for a craps table. In one embodiment, the system may include a keyboard operable to receive die pair data; and a display coupled with the keyboard, the display operable to display current and previous die pair data. In one example, the display of current and previous die pair data includes graphic representations of the faces of each die of the current and previous die pair data. The display may also include a display portion operable to display an indicator of a current point value of the craps game.

According to another broad aspect of an embodiment of the present invention, disclosed herein is a method of displaying information related to a craps game played at a craps table. In one example, the method includes providing a display associated with the craps table; obtaining data relating to a first die pair rolled by a shooter; storing the data relating to the first die pair; and displaying on the display a representation of the data relating to the first die pair.

In one example, the representation of the data relating to the first die pair includes a graphic representation of the numeric value of each die of the first die pair, or the representation of the data relating to the first die pair includes a graphic representation of the face of each die of the first die pair.

In one embodiment, the method may also include displaying on the display an indicator of a current point value of the craps game. The method may also include displaying on the display one or more indicators indicating establishment of a point value. The method may also include displaying on the display one or more indicators indicating a winning die pair. The method may also include displaying on the display one or more indicators indicating a change in a shooter.

In one embodiment, the method may also include obtaining data relating to a second die pair rolled by the shooter; storing the data relating to the second die pair; and displaying on the display a representation of the data relating to the second die pair. The representation of the data relating to the second die pair may be temporarily located in a position proximate a top of the display. If desired, the representation of the data relating to the first die pair may be located below the representation of the data relating to the second die pair. The method may also include reducing the size of the representation of the data relating to the first die pair so that the size of the representation of the data relating to the second die pair is larger than the size of the representation of the data relating to the first die pair.

In one embodiment, the method may also include providing the representation of the data relating to the first die pair in a first color; and providing the representation of the data relating to the second die pair in a second color.

The features, utilities and advantages of the various embodiments of the invention will be apparent from the following more particular description of embodiments of the invention as illustrated in the accompanying drawings.

DETAILED DESCRIPTION

Disclosed herein is an electronic display for a craps table that dynamically shows historical data of the dice pair rolls that have occurred during the game. Various embodiments of the present invention are disclosed herein.

Figure 1:
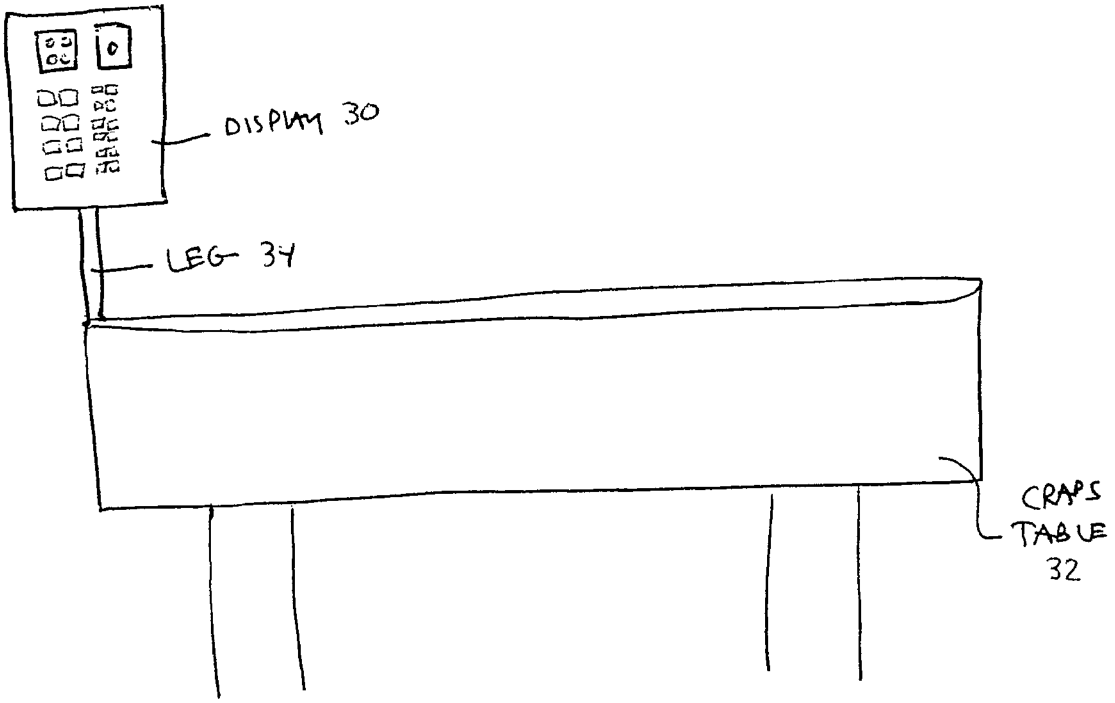
FIG. 1 illustrates an example of a display attached to or associated with a craps table, in accordance with one embodiment of the present invention.

In FIG. 1, a display 30 showing historical dice roll data (hereinafter "dice pair roll data") may be, in one example, attached to a conventional craps table 32. The display 30 can have one or more features that are disclosed herein. In one example, the display 30 may be attached through a support arm or leg 34 that is positioned about the end or edge or side of the craps table 32, and the display 30 is positioned above the top edge of the table so that the display is easily viewable by one or more players or observers of the craps game being played at the craps table 32. In another example, the display 30 could be positioned so that it is positioned in the middle of the table 32, wherein the arm/leg 34 is upwardly extending from the middle of the surface of the craps table 32. In another example, the display 30 could also be positioned above the craps table 32, for example suspended from the ceiling or attached to a column or wall, if desired.

In another example, the display 30 can be provided as a stand-alone display (which is not secured to the table), wherein the display 30 is mounted on a stand so that the display 30 is positioned at a height viewable to players and observers of the craps game. For instance, the stand-alone display can be positioned approximately 5 to 7 feet or higher above the ground to facilitate viewing, and can be positioned behind the boxman, if desired (i.e., so as to reduce the amount of space consumed by the display 30 around the craps table 32 where players would otherwise stand).

Figure 2:
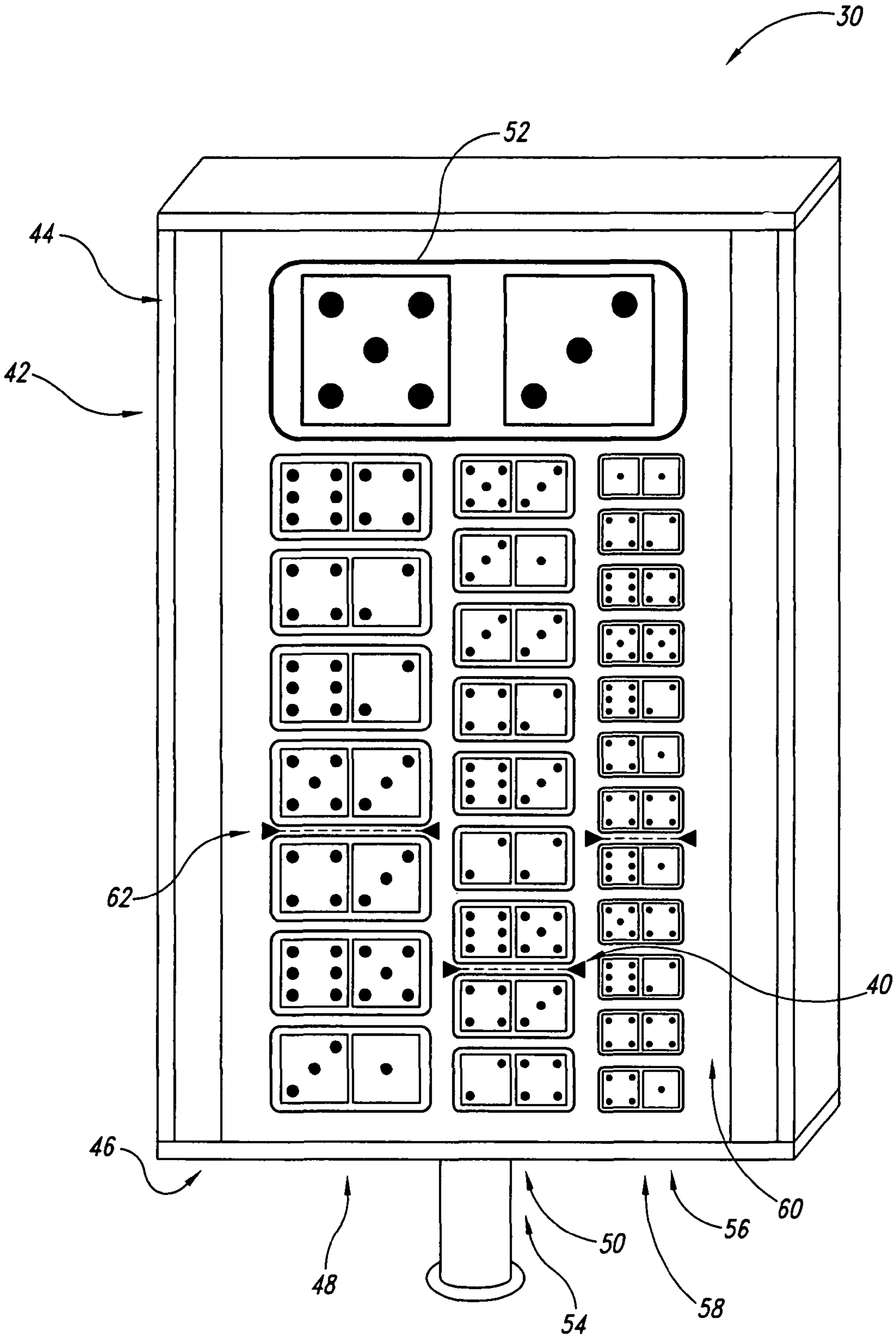
FIG. 2 illustrates an example of a display for a craps table, in accordance with one embodiment of the present invention.

FIG. 2 illustrates an example of a display 30 for a craps table, in accordance with one embodiment of the present invention. In one example, the display 30 includes at least one active display screen 40, and historical data relating to the dice that have been rolled during a craps game are displayed on the active display screen portion 40 of the display 30. A display 30 may include two, three, or four or more active display screens, depending upon the number of sides the display has in a particular implementation. For instance, a four-sided display (not shown) may be provided with one active display screen 40 per side, totaling four active display screens in this example. In one example, a craps table display 30 may have a generally rectangular box shape and may be formed of anodized aluminum extrusion cases, a sheet metal enclosure, or other conventional material.

An active display screen 40 of a display 30 may include a plurality of indicia 42, 46, 54, 58 representative of rolled dice values. A first indicia 42 can be displayed corresponding to the numeric values of a first and second die (hereinafter the "dice pair") that have been most recently rolled, shown in FIG. 2 as the current roll 52. In one example, the first indicia 42 includes a graphical representation of the face of each die of a pair of dice. For example, in FIG. 2, the first indicia 42 includes a graphical representation of a pair of dice, wherein the first die was a five and the second dice was a three. In another example, the first indicia 42 may include a first and second number which correspond to the numeric value of the first and second die. For instance in FIG. 2, the first indicia 42 could be represented as a pair of numbers, such as 5, 3.

One benefit of the use of indicia which include graphical representations of the dice (such as shown in FIG. 2) is that the graphical representations of the dice provide the information to an observer as if the observer were watching the rolls of dice at the craps table 32. For instance, in a display 30 such as the example of FIG. 1, it is easy for an observer to review the display 30 and see that a roll occurred that had pair of dice having the same number, such as a pair of sixes, a pair of ones (snake eyes), etc.

Preferably, the first indicia 42 of the current roll 52 is positioned near the top of the active display screen area 40, and is displayed within a first area 44 which is larger than other indicia, described below.

Historical dice pair roll data can be displayed in a number of ways. In one example, historical dice pair roll data is displayed in one or more of columns, as shown in FIG. 2. A first set of indicia 46 can be presented in the active display screen 40, wherein the first set of indicia 46 include a plurality of representations of pairs of prior dice rolls. This first set of indicia 46 may be arranged in a vertical column arrangement 48, wherein more recent dice pair roll data are displayed higher within a column 48 than older dice pair roll data.

In one example, the display of dice pair roll data is displayed wherein the most recent dice pair roll data is displayed at the top of the active display screen 40, the second most recent dice pair roll data (older than the most recent dice pair roll data) is displayed below the most recent dice pair roll data, the third most recent dice pair roll data is displayed below the second most recent dice pair roll data, the fourth most recent dice pair roll data is displayed below the third most recent dice pair roll data, and so on. In this manner, an observer can easily see the history of the rolled dice of a craps game.

Figure 3:
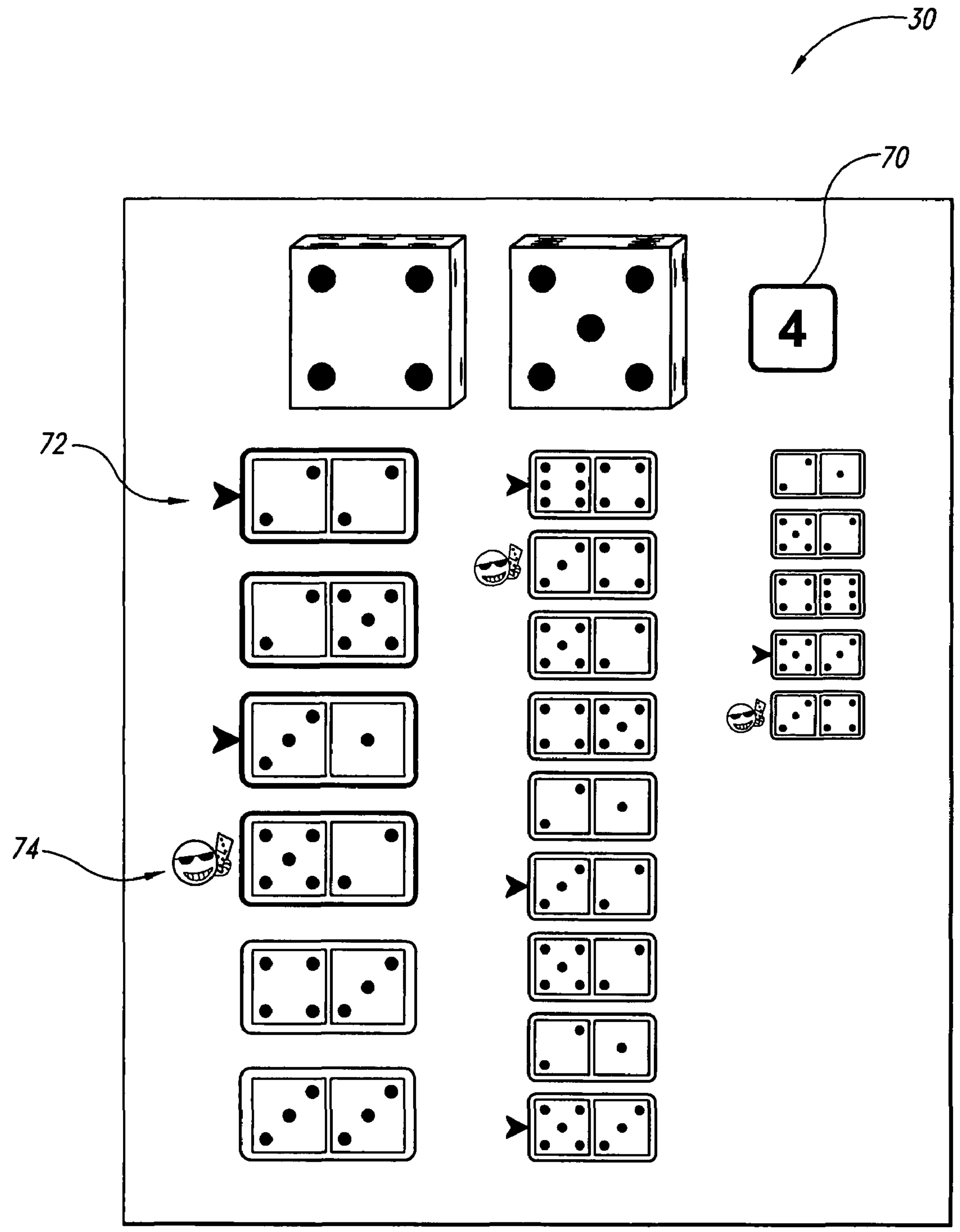
FIG. 3 illustrates another example of a display for a craps table, in accordance with one embodiment of the present invention.

In one example, in the first column of historical dice pair roll data 48, the first set of indicia 46 are each sized to occupy a second area per piece of historical dice pair roll data. The second area for each piece of historical dice pair roll data in the first column 48 can be sized smaller than the first area which is used to display the current roll value 52 (i.e., each second area occupied by a representation of a dice pair roll data can be smaller than each first area, as shown in FIGS. 2-3).

A second column of historical dice pair roll data 50 may be provided and positioned adjacent to the first column 48. The top entry of the second column 50 may include the historical dice pair roll data which immediately preceded in time the value of the dice pair roll data indicated at the bottom element of the first column 48, in one example. As with the first column 48, the second column 50 may also be arranged in chronological order such that the older historical dice pair roll data are displayed below more recent historical dice pair roll data within the second column 50.

Each of the second set of indicia 54 in the second column of historical dice pair roll data 50 may occupy a third area, the third area being smaller than the second area of the first column. In this way, the older dice pair roll data are displayed using smaller amounts of area in the display, which make the display easily understandable to a viewer (i.e., each third area occupied by a representation of a dice pair roll data can be smaller than each second area, as shown in FIGS. 2-3).

A third column of historical dice pair roll data 56 may be included in an active display screen 40 of a craps table display 30, and may be positioned adjacent to the second column 50. As shown in the example of FIG. 2, the third column 56 may include, at the top of the third column 56, the value of the historical dice pair roll data which immediately preceded in time the value of the dice pair roll data indicated at the bottom element of the second column of historical dice pair roll data 50. As with the first and second columns, the third column 56 may also be arranged in chronological order such that the older historical dice pair roll data are displayed below more recent historical dice pair roll data within the third column 56. Each of the third set of indicia 58 in the third column of historical dice pair roll data 56 may occupy a fourth area, the fourth area being smaller than the third area of the second column 50 (i.e., each fourth area occupied by a representation of a dice pair roll data can be smaller than each third area, as shown in FIGS. 2-3).

In operation, as new dice pair roll data is received for display, each of the values in the display 30 shift downward in general within a single column, and any data displayed at the bottom of a column is shifted to be displayed at the top of the next column (except for the oldest piece of dice pair roll data, which is dropped from the display if the display was full). For instance, in the example of FIG. 2, the most recent dice pair roll data 52 is shown as 5, 3; the next most recent dice pair roll data is shown at the top of the first column 48 as 6, 4, and six rolls prior to that, the dice pair roll data of 3, 1 is displayed at the bottom of the first column 48, followed by dice pair roll data 5, 3 displayed at the top of the second column 50, followed eight rolls later by 2, 4 which is displayed at the bottom of the second column 50, followed by 1, 1 which is displayed at the top of the third column 56, followed eleven rolls later by the oldest roll data 60 of 4, 1 displayed at the bottom of the third column 56.

When new dice pair roll data is received and displayed in the active display screen 40, the most recent roll data of 5, 3 moves to the top of the first column 48, and each of the dice pair roll data shifts downward within the first column 48 by one position, except that the value of 3, 1 which occupied the bottom of the first column 48 is now displayed (in smaller format, in one example) at the top of the second column 50. The dice pair roll data in the second column 50 are also shifted downward by one position, except that the dice pair roll data of 2, 4 which occupied the bottom location in the second column 50 will then be displayed (in smaller format, in one example) at the top of the third column 56, and the dice pair roll data in the third column 56 will be shifted downward by one position. The lowest or last entry of dice pair roll data 60 displayed at the bottom or lowest portion of the third column 56 will no longer be displayed when the display is full, as it will be replaced with the dice pair roll data immediately above it, in one example (i.e., 4, 1 will be replaced with 4, 4 in the example of FIG. 2).

In another embodiment, the arrangement of the historical dice pair roll data can be reversed, so that most recent dice pair roll data is displayed near the bottom of the active display screen 40, and the older dice pair roll data information is displayed in sequence upwardly toward the top of the active display screen 40.

As shown in the example of FIG. 2, a display 30 may also be provided with an indicia 62 indicating a new shooter or different shooter of a craps game. In FIG. 2, the new shooter indicia 62 is shown as a pair of arrows with a dashed line therebetween, although other indicia may be utilized to indicate that the shooter changed between the adjacent dice pair roll data. It can be seen that there have been four different shooters in this example, the first transition between shooters occurred when a first shooter rolled a 6, 1, and thereafter the second shooter's first roll was 4, 4. The second shooter's final roll was 4, 3, and that shooter was replaced by a third shooter whose first roll was 6, 5. The third shooter's final roll was a 4, 3 and the fourth/current shooter's first roll was a 5, 3. The fourth/current shooter's most recent roll was 5, 3.

By indicating the transition of shooters through use of some form of an indicia on the display, embodiments of the present invention provide an observer with the ability to easily see the historical dice pair roll data that the present shooter has rolled, as well as the historical dice pair roll data for one or more prior shooters.

In another embodiment, changes of the shooter may be indicated by changing the color of the indicia of the dice pair roll data within the active display screen 40. In one example, the color of the dots of the dice roll data corresponding to a first shooter are displayed in a first color; the color of the dots of the historical dice pair roll data of a second shooter are displayed in a second color; the color of the dots of the dice of the historical dice pair roll data of a third shooter are displayed in a third different color; etc. In another example, the color of the dice themselves, and/or an outline or highlight color for each piece of historical dice pair roll data in the display may uniquely indicate and correspond to different shooters.

FIG. 3 illustrates another example of a display 30 for a craps table 32, in accordance with one embodiment of the present invention. In FIG. 3, a field 70 is provided for displaying the current "point" value in the craps game. The "point" is the number that, once established, needs to be rolled again before a seven is rolled in order to win a pass line bet. The point can be a 4, 5, 6, 8, 9 or 10, traditionally. An indicia 72 (shown as an arrowhead) can be provided which is pointed at the historical dice pair roll data which established the point, and this indicia 72 may be retained and associated with this historical dice pair roll data as the data scrolls through the display as other new rolls are displayed. In one embodiment, if the current roll established a new "point" value, then an arrowhead or other indicia can be indicated next to the current roll display field.

In another embodiment as shown in FIG. 3, an indicia 74 can be provided for showing a winning roll and can be associated and retained the historical dice pair roll data as the data scrolls through the display as other new rolls are displayed. A display 30 can be provided, which can include one or more of the features of FIG. 2 or FIG. 3 or as otherwise disclosed herein or variations thereof.

In one example, the display 30 may include a display portion 42/52 operable to display a representation of data relating to a current die pair rolled by a shooter; and a display portion 46 operable to display a representation of data relating to previous die pairs rolled. In one example, the representation 42/52 of the data relating to the current die pair includes a graphic representation of the face of each die of the current die pair. A display may also include a display portion 70 operable to display an indicator of a current point value of the craps game.

In one embodiment, a display 30 may also include one or more indicators 74 indicating a winning die pair; and/or one or more indicators 62 indicating a change in a shooter.

In one embodiment and as described below, a system for a craps table may include a keyboard operable to receive die pair data; and a display coupled with the keyboard, the display operable to display current and previous die pair data. In one example, the display of current and previous die pair data includes graphic representations of the faces of each die of the current and previous die pair data. The display may also include a display portion operable to display an indicator of a current point value of the craps game.

A method of displaying information related to a craps game played at a craps table is also disclosed herein. In one example, the method includes providing a display 30 associated with the craps table 32; obtaining data relating to a first die pair rolled by a shooter; storing the data relating to the first die pair; and displaying on the display 30 a representation of the data relating to the first die pair. In one example, the representation of the data relating to the first die pair includes a graphic representation of the numeric value of each die of the first die pair, or the representation of the data relating to the first die pair includes a graphic representation of the face of each die of the first die pair. In one embodiment, the method may also include displaying on the display 30 an indicator of a current point value of the craps game. The method may also include displaying on the display 30 one or more indicators indicating establishment of a point value. The method may also include displaying on the display 30 one or more indicators indicating a winning die pair. The method may also include displaying on the display 30 one or more indicators indicating a change in a shooter.

In one embodiment, the method may also include obtaining data relating to a second die pair rolled by the shooter; storing the data relating to the second die pair; and displaying on the display a representation of the data relating to the second die pair. The representation of the data relating to the second die pair may be temporarily located in a position proximate a top of the display. If desired, the representation of the data relating to the first die pair may be located below the representation of the data relating to the second die pair. The method may also include reducing the size of the representation of the data relating to the first die pair so that the size of the representation of the data relating to the second die pair is larger than the size of the representation of the data relating to the first die pair.

In one embodiment, the method may also include providing the representation of the data relating to the first die pair in a first color; and providing the representation of the data relating to the second die pair in a second color.

Figure 4:
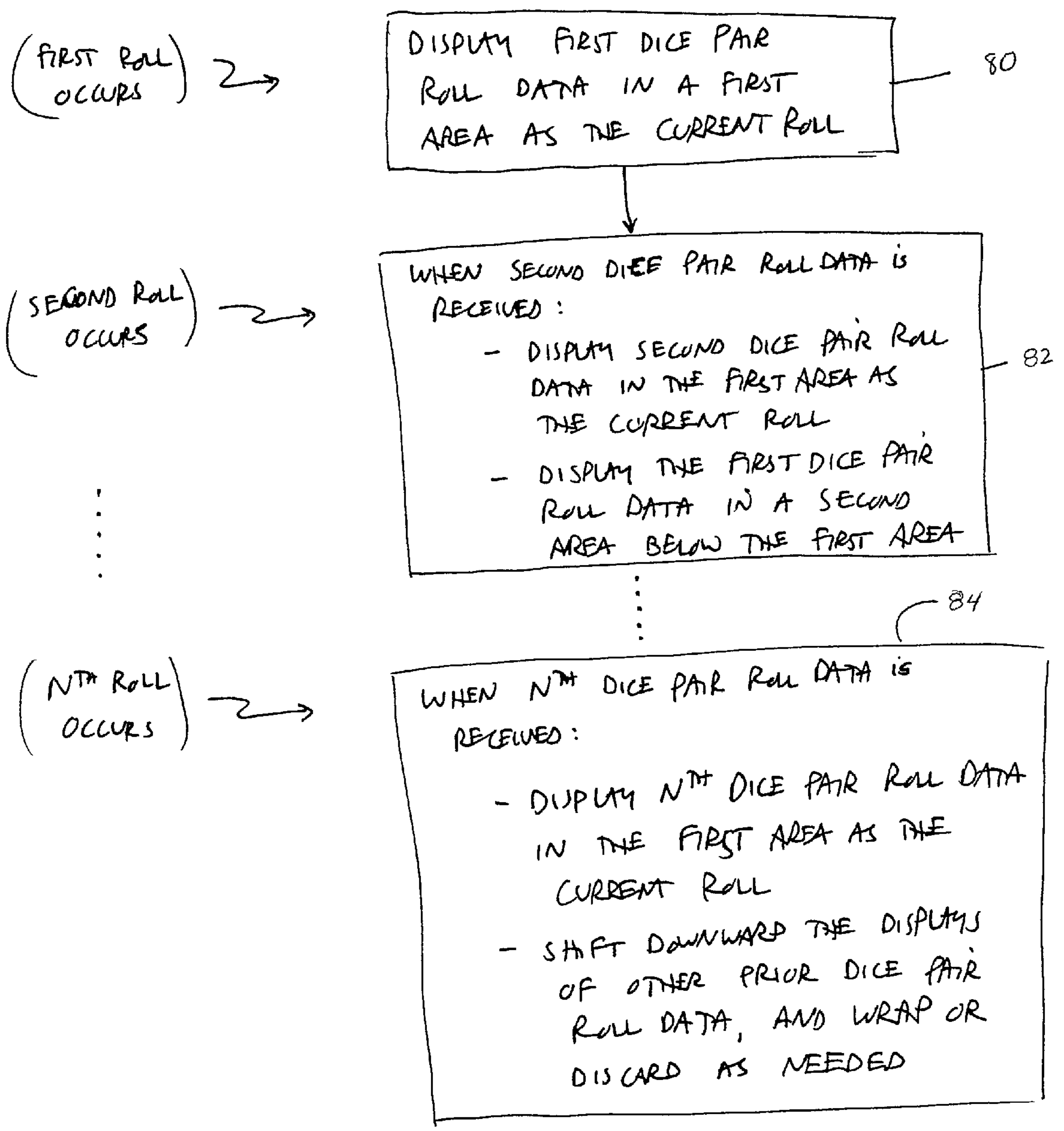
FIG. 4 illustrates an example of operations for displaying dice roll data in a display for a craps table, in accordance with one embodiment of the present invention.

FIG. 4 illustrates an example of operations for displaying dice roll data in a display 30 for a craps table 32, in accordance with one embodiment of the present invention. At operation 80, after a first roll occurs, the first dice pair roll data is displayed in a first area of the display 30 as the current roll 52. As mentioned above, if the current roll established a new point then an arrowhead or other indicia can be indicated next to the current roll display field.

At operation 82, after a second roll occurs, the second dice pair roll data is displayed in a first area of the display 44 as the current roll 52, and the display of the first dice pair roll data can be shown adjacent to (i.e., below) the first area 44 of the current roll display field. This process continues as additional rolls occur. For instance at operation 84, after the Nth roll occurs, the Nth dice pair roll data is displayed in a first area of the display as the current roll, and the display of the (N-1) dice pair roll data can be shown adjacent to (i.e., below) the first area of the current roll display field. The displays of the other prior dice pair roll data are shifted (i.e., downward) and if applicable wrapped to the top of the next column if a multi-column display format is used. If the display was full of data, then the oldest piece of historical dice pair roll data 60 is discarded and removed from the display 30.

Figure 5:
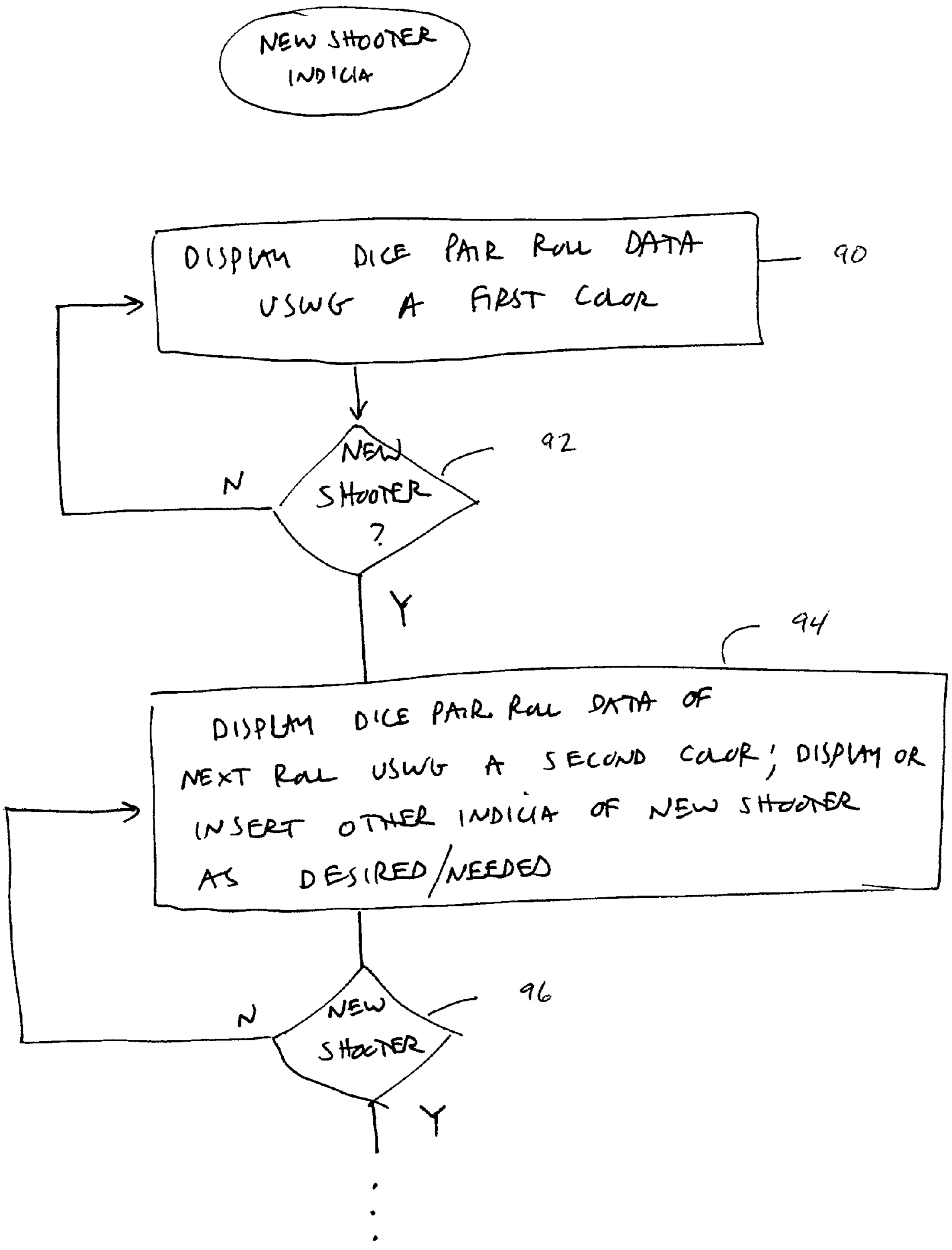
FIG. 5 illustrates an example of operations for displaying a change in the shooter in a display for a craps table, in accordance with one embodiment of the present invention.

FIG. 5 illustrates an example of operations for displaying a change in the shooter in a display 30 for a craps table 32, in accordance with one embodiment of the present invention. At operation 90, a display of dice pair roll data is presented using a first color. Operation 92 determines whether a shooter has changed (for instance, as flagged by the stickman or other person using a keypad, as described below), and if not, the display of the next dice pair roll data in the display can use the same color as in operation 90. If operation 92 detects a change in the shooter, then control is passed to operation 94 wherein the display of the next dice pair roll data is shown using a different color than used in operation 90.

Operation 96 determines whether a shooter has again changed (for instance, as flagged by the stickman or other person using a keypad, as described below), and if not, the display of the next dice pair roll data in the display can use the same color as in operation 94, otherwise if the shooter has changed, then another color can be used for display of the next dice pair. In this way, the colors of the dice pair roll data in the display 30 can be used to indicate a change in the shooter, if desired.

Figure 6:
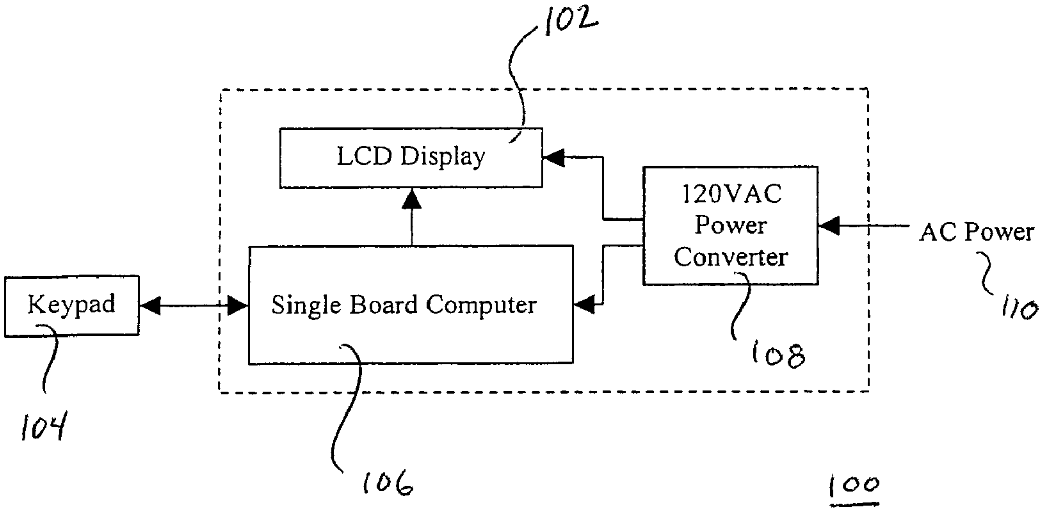
FIG. 6 illustrates a block diagram of an example of a system for providing a display for a craps table, in accordance with one embodiment of the present invention.

Disclosed herein are various embodiments of display systems that can be used with a craps table. FIG. 6 illustrates a block diagram of an example of a system 100 for providing a display 30 for a craps table 32, in accordance with one embodiment of the present invention. In one example, a display system 100 for a craps table 32 may include a display 102 (as described with regard to any embodiment disclosed herein) coupled with or in communication with a keyboard 104 (used to enter dice pair roll data or other commands such as "change shooter"), and a computer 106 (such as but not limited to a single-board computer, a micro-controller or microprocessor, or other programmable logic or state machine or processor, and these terms are used interchangeably herein). The computer 106 is coupled with and controls a display 102, such as an LCD display, and is also coupled with the keypad 104 to read the data or commands from the keypad 104, such as dice pair roll data. Based on the data or commands received from the keyboard 104, the computer 106 controls the display of information on the display 102.

A display driver (not shown) may be provided, either as part of the display 102 or as part of the computer 106, depending upon the implementation. A power supply/converter/regulator 108 can be utilized in order to provide power to the system. In one example, AC power 110 is utilized for the system, and a power converter 108 (which converts AC power to DC power) may be utilized in order to provide power to the display 102, computer 106, and keypad 104, in one example. In another example, DC or battery power is utilized to provide power to one or more elements of the system. Any conventional means of providing power may be utilized with the system.

In one example, the keypad 104 is coupled with the computer 106 via a serial communications link, including, but not limited to, serial communication protocols such as USB, RS232, or any conventional link or protocol, including wired or wireless communication links that may be encrypted/secured if desired. Likewise, the display 102 may be coupled with the computer 106 over wired or wireless links, as desired.

In one example, the computer 106 reads the button depressions on the keyboard 104, or receives data related thereto, creates one or more events or changes of state based thereon in order to change the display 102 in a manner responsive to the particular keypad depressions. The computer 106 may implement one or more of the operations or features described herein, including tracking state of the display, storing historical data that is to be written to the display, etc. If desired, the display 102 can be provided with the functionality of the computer 106, or such functionality can be integrated within the keypad 104, if desired, depending upon the implementation.

The computer/controller 106 of FIG. 6 may include of a diskless single board computer that may, for example, use MS Windows or Linux as an operating system running from Flash RAM having application software written, for example, in MS Visual Basic to provide for serial port communication with the keypad 104 to generate the graphics to be shown on the LCD display 102. A single board computer 106 simplifies the engineering development of the system 100 by leveraging the high level communication and display services provided with such a relatively high performance computing platform and enjoying the relatively low cost. In another embodiment, the computer/controller 106 of FIG. 6 can be a microcontroller, programmable logic device, custom ASIC or other conventional processor.

The display 102 may be an LCD display, such as a 22" diagonal LCD22IR by Miller Technologies. In this application, the LCD 102 display is oriented with its tall axis in the vertical direction to better display the information. Any conventional display 102 could be used, utilizing any conventional display technology, depending upon the implementation. As mentioned above, multiple displays may be included in the display device 30 (i.e., one display on the front side of the display device 30, another display on the back side of the display device 30).

Figure 7:
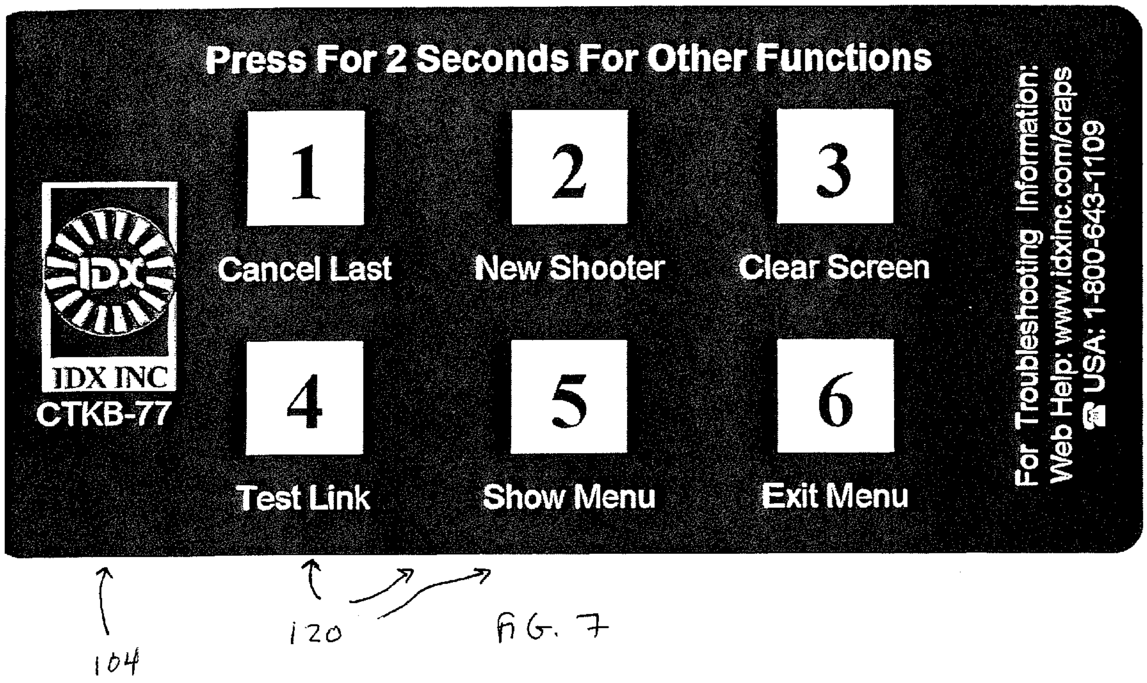
FIG. 7 illustrates an example of a keypad for controlling a display of a craps table, in accordance with one embodiment of the present invention.

The keypad 104 may include, in one example, six keys or characters 120, as shown in FIG. 7. In FIG. 7, each key 120 of the keypad 104 corresponds to a value of a single die. For instance, if a pair of dice were rolled and the value rolled was 2, 6, then the keyboard or keypad 104 could be depressed with 2 and 6 in order to display this dice pair roll data. In another example, one or more of the buttons 120 of a keypad 104 may activate a function or command, for example if the button 120 is pressed and held for a predetermined about of time (i.e., pressed and held for 2 seconds or more, in one example). For instance, a "cancel last" function may be provided, wherein the last dice pair roll data entry is canceled. This function may be useful in the event that there is a data entry error that needs to be corrected. For instance, if the data entered was 2, 6, but in fact should have been 2, 5, the cancel last function can be activated so that the display of 2, 6 is canceled and the data of 2, 5 can be entered and displayed.

In another embodiment, a "new shooter" function can be provided wherein when a button 120 of the keypad 104 (such as the "2" button is depressed and held for at least 2 seconds) then the keypad 104 sends data or a message indicating that the a new shooter has been indicated, so that the display 30 can be modified to provide or illuminate a new shooter indicia, as described above.

In another embodiment, a "clear screen" function may be provided in order to clear the historical dice pair roll data from an active display screen 40.

In one example, the keypad 104 may have multiple modes of operation—Normal Mode may be associated with usual game play, Command Mode may provide additional control capability to the operator, and Menu Mode may be provided for setup and diagnostic functions. In Normal Mode, the stickman, boxman or other person is expected to press two buttons to convey to the display controller which dice have been rolled. As each button is pressed, it becomes lit to indicate it has been pressed. In one example, if a second button is not pressed within 2 seconds, the LED in the first button is turned back off and the sequence is reset. When the values for the two die have been entered and after second button has been pressed, a message sent to the display controller (not shown). In one example, the message may include a prefix ASCII character "D" and the ASCII characters representing number of each of the buttons pressed. The response is either ACK or NAK, wherein the latter will cause re-transmission of the same message. In one example, the LED for the second button can be kept on for example for a minimum of 500 ms, and then will either turn off then simultaneously with the first button LED, or remain turned on until a NAK is received, or for 5 seconds, whichever is shorter. If the same button is pressed twice (such as when the shooter rolls a pair of 4's, the button can blink at a faster rate (i.e., 8 times per second) during the time until it is to be turned off.

In another embodiment, other features such as providing a menu can be included. A menu mode may be provided having various menu functions depending upon the particular implementation. A test function may also be provided if desired, which may, for example, be used to test a communications link between the keypad and other components, such as a controller or display, if desired.

Figure 8:
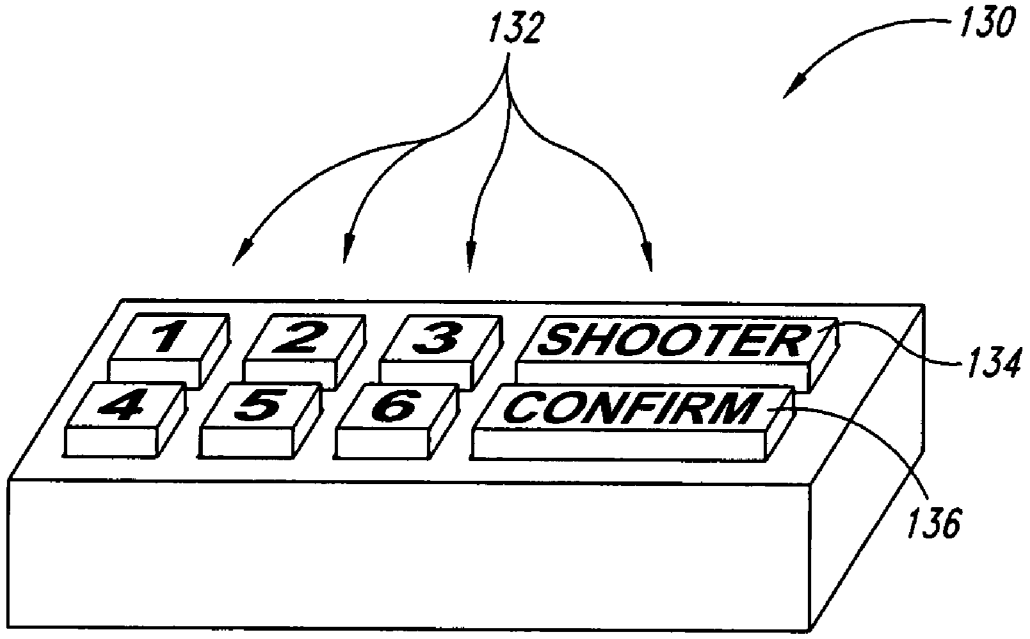
FIG. 8 illustrates another example of a keypad for controlling a display of a craps table, in accordance with one embodiment of the present invention.

FIG. 8 illustrates another example of a keypad arrangement 130, in accordance with one embodiment of the present invention. In this example, six numeric keys 132 are provided, as well as a "shooter" button 134 which can be utilized to change the shooter; as well as a "confirm" button 136 which can be used to confirm data entry, in one example.

In one example, each time the dice are rolled the stickman, boxman or other person inputs the results into the keypad 130. The buttons may be back lighted and can toggle on and off with repeated hits to enable correction of an erroneous button presses. When the correct numbers are lighted on the keypad, the Confirm button 136 is pressed to send the information to the display 30. The Shooter button 134 is pressed to indicate when there is a new shooter. To cancel the previous input to the display 30, the Confirm button 136 can be held down for at least 5 seconds (or other time value, depending on the implementation). To clear the display 30 completely to indicate the start of new daily session, the power can be cycled to the unit, or in one example the Shooter button 134 can be held down for at least 5 seconds or other time value depending on the implementation.

Figure 9:
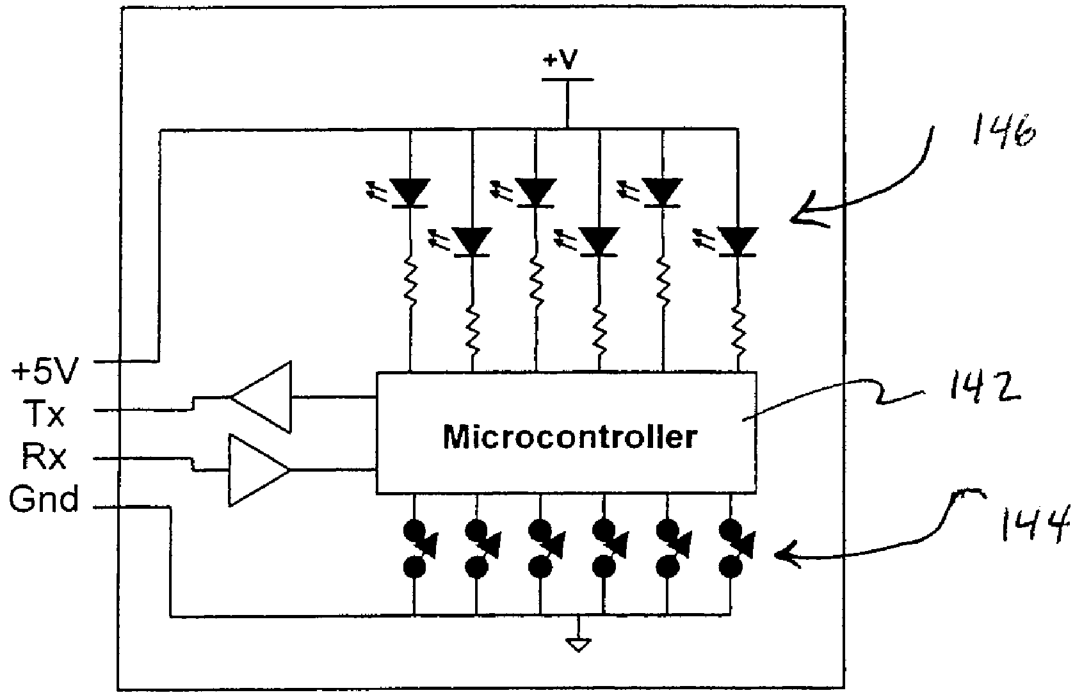
FIG. 9 illustrates a block diagram of a keypad for controlling a display for a craps table, in accordance with one embodiment of the present invention.
Figure 10:
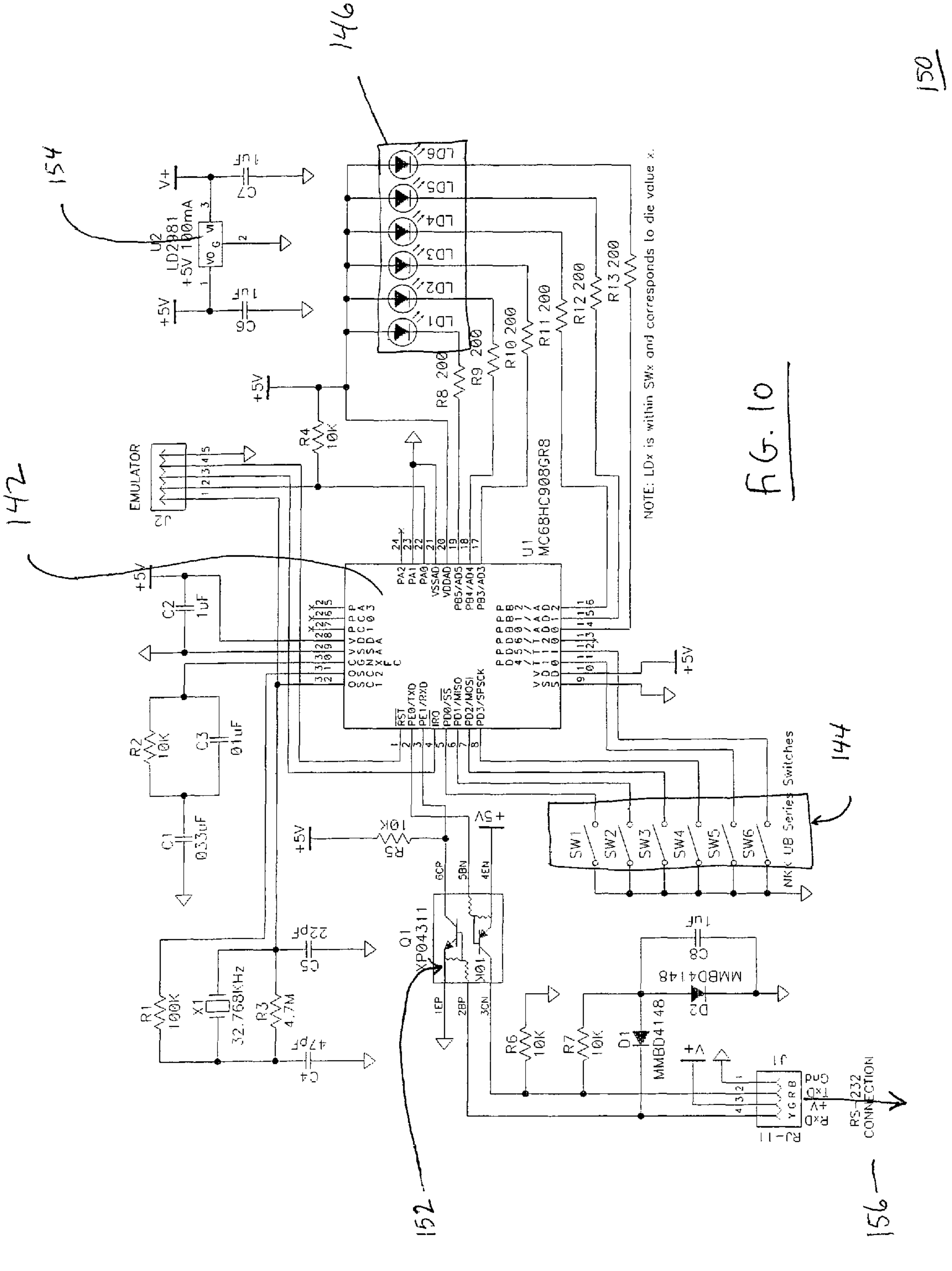
FIG. 10 illustrates an example of a circuit schematic for a keypad for controlling a display for a craps table, in accordance with one embodiment of the present invention.

FIG. 9 illustrates a block diagram 140 of a keypad 104 for controlling a display 30 for a craps table 32, and FIG. 10 illustrates an example of a circuit schematic 150 for a keypad for controlling a display for a craps table, in accordance with one embodiment of the present invention. A keypad 104 may include a micro-controller 142, six switches 144 as inputs to the micro-controller, six LEDs 146 which can be used to selectively illuminate or backlight the buttons of the keypad 104 (these LEDs configured as outputs of the micro-controller). The keypad 104 may also include a serial communication interface chip 152, such as a UART coupled with the microcontroller 142. The UART interface 152 provides for RS232 interface communications with the computer 106 of FIG. 6, in one example.

As by way of example only, the keypad may communicate to the display controller through an RS-232 serial link 156. The cable may use a 4-wire interface having +5V power, ground, transmit (Tx) and receive (Rx), and having an RJ-11 (telephone style) connector, in one example. The keypad 104 may have a microcontroller 142 such as the Freescale MC68HC908GR8 which has parallel port pins suitable for controlling the six resistor-biased LED indicators 146 and six push button switches 144. The push button switches 144 can be connected to parallel port pins configured with internal pull-up resistors such that when a button 120 is pressed the port pin goes low and may be detected by the firmware of the microcontroller 142. Each of the indicator LEDs 146 can be located within the pushbutton and indicates the status of the pushed button to the operator. The microcontroller 142 may have an internal UART 152 transmitting messages to, and receiving messages from, the display controller 106. An electrical interface may be established through a buffer transmitter and receiver such as the MAX232 from Maxim.

In another embodiment, the keypad 104 may be implemented as a wireless keypad, such as in the form of a handheld device, and may be in communications with the display over any conventional wireless link, such as Bluetooth for example.

Depending on the implementation, the data entry of the dice pair roll data may be performed, using a keypad 104, by the stickman or other person, in accordance with one embodiment of the present invention.

Figure 11:
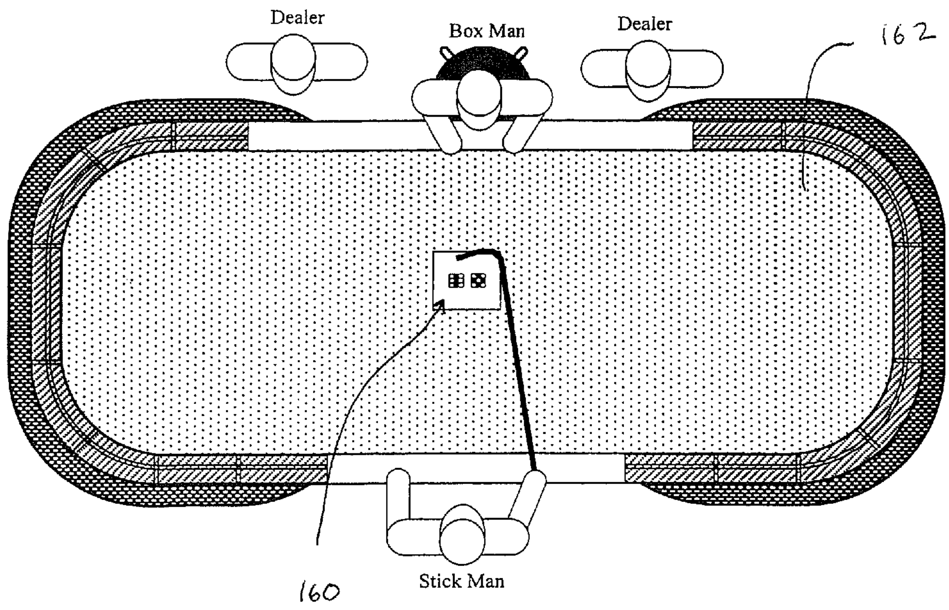
FIG. 11 illustrates a top view of a craps table having a window surface therein, in accordance with one embodiment of the present invention.
Figure 12:
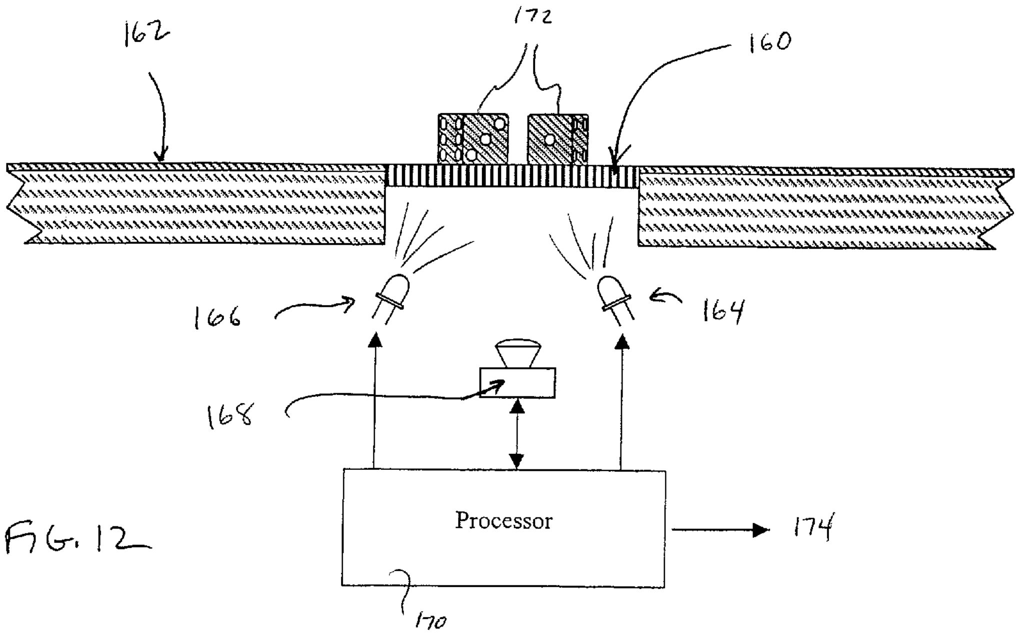
FIG. 12 illustrates a block diagram of a dice value detection/recognition system with a sectional view of a portion of the craps table of FIG. 11, in accordance with one embodiment of the present invention.

In another embodiment, a dice detection/recognition system may be utilized as an alternative mechanism for providing dice pair roll data, as shown in FIGS. 11-14. In one example, the craps table 32 is provided with a translucent or transparent area, window or surface 160 where the rolled dice may be positioned momentarily (FIGS. 11-12). Because all dice have a fixed relationship between the bottom side and top side, a dice recognition system can determine the dice pair roll data by examining the dice from the bottom side thereof.

In one example, controllable illumination may be provided which can be selectively enabled or disabled beneath the surface of the craps table 162 to illuminate the dice from below the table through the window 160. FIG. 12 illustrates an example of a cross-section of a craps table 32 having a transparent window 160 along its surface 162, one or more light sources or transmitters 164, 166, and one or more detectors 168. The light transmitters 164, 166 and detectors 168 may be coupled with a processor 170 which controls the transmitters 164, 166 and reads the data provided by the detector 168. The processor 170 could, in one example, read the data from the bottom side of the dice 172, and determine what the proper dice pair roll data 174 is to be displayed, as well as communicate that information to the display 30 directly or indirectly.

In one example, the window 160 may be transparent to infrared light. In one example, the window 160 may have a deep red dyed color to a visual black color, infrared transmissive type such as GE Lexan with dye color 21092. The lights 164, 166 can be infrared LEDs (i.e., Siemens SFH487P) used to illuminate the dice from below through the window 160. The image capture device 168 may include any conventional camera or image capturing device, such as a USB camera. Algorithms for background subtraction and edge finding are well known in the art. Identification and counting of individual objects is also well known in the art. Thus identifying the individual die and counting the number of spots on each utilizes techniques well understood to those experienced in the art of image recognition.

Figure 13:
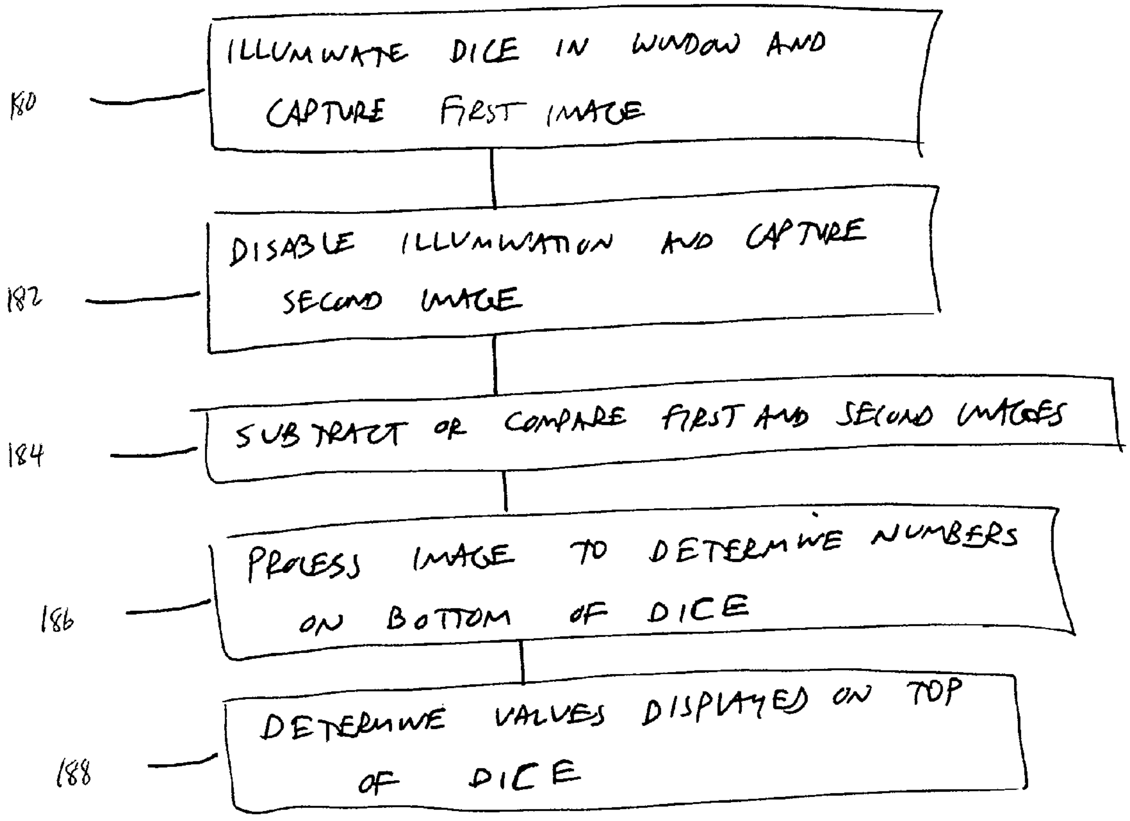
FIG. 13 illustrates an example of operations for recognizing the value of a pair of dice rolled, in accordance with one embodiment of the present invention.

FIG. 13 represents an example of operations which may be performed in order to detect the value of a pair of rolled dice, in accordance with one embodiment of the present invention. At operation 180, having the dice positioned within the window 160, the illuminators 164, 166 may be enabled and an image may be captured of the illuminated dice 172. At operation 182, the illuminators 164, 166 may be disabled/turned off, and an image of the dice 172 with the illuminators disabled may be captured. The order of operations 180 and 182 may be changed, depending upon the implementation.

Having captured images of the dice 172 with the bottom side of the dice illuminated and not illuminated, these images may be manipulated in order to determine the value of the dice pair roll data. At operation 184, a pixel-by-pixel difference between the images obtained by operations 180, 182 can be generated, which in effect subtract the background from the images of operations 180, 182. At operation 186, an edge finding algorithm or other conventional image processing algorithm, may be utilized to determine the value displayed on the bottom side of each of the die.

Figure 14A:
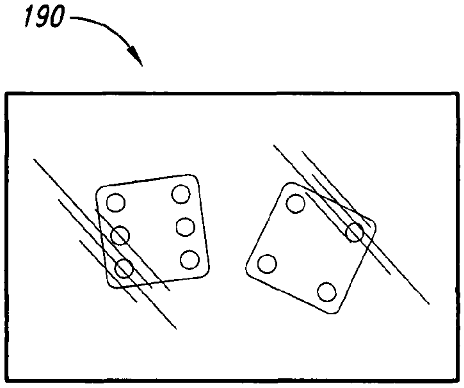
FIGS. 14A-D illustrate examples of captured and processed images for dice value recognition, in accordance with one embodiment of the present invention.
Figure 14B:
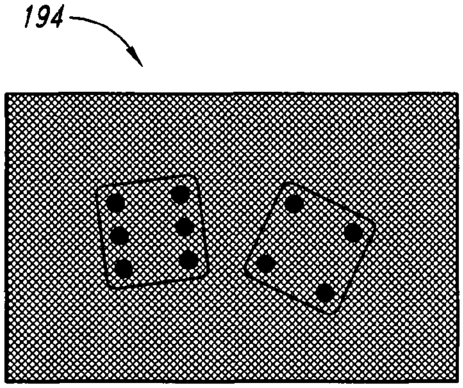
Figure 14C:
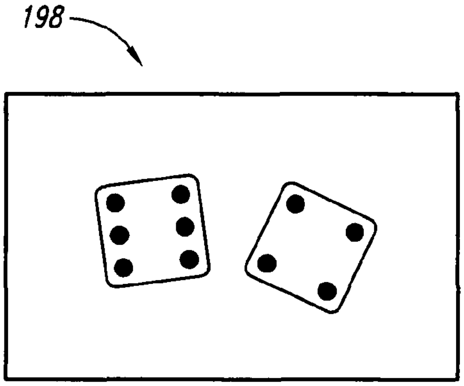
Figure 14D:
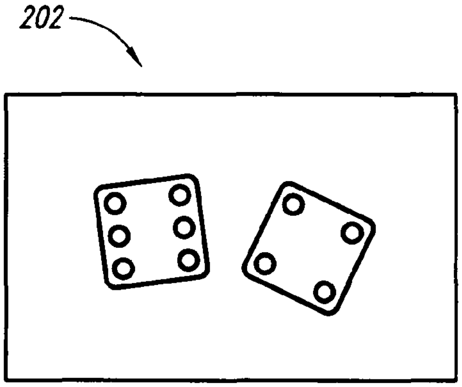

FIG. 14A shows an example of a captured image 190 of the bottom of a pair of dice 172 when illuminated; FIG. 14B shows an example of a captured image 194 of the bottom of a pair of dice 172 when not illuminated; FIG. 14C shows an example 198 of the difference between FIGS. 14A and 14B; and FIG. 14D shows an example 202 of a the results of an edge finding process.

Based on the value displayed on the bottom of each die, at operation 188 of FIG. 13, the value of the dice pair roll data can be determined. The following mapping may be used by operation 188 to determine the value of the roll:

TABLE 1

Mapping between Bottom-side Die values and Top-side Die values

| Bottom-side Die reading | Top-side Die value |
|---|---|
| 1 | 6 |
| 2 | 5 |
| 3 | 4 |
| 4 | 3 |
| 5 | 2 |
| 6 | 1 |

Once the value of a pair of rolled dice 172 is determined, the processor 170 of FIG. 12 can transmit the dice pair roll data to the computer/display 102, 106 for presentation on the display 30.

Figure 15:
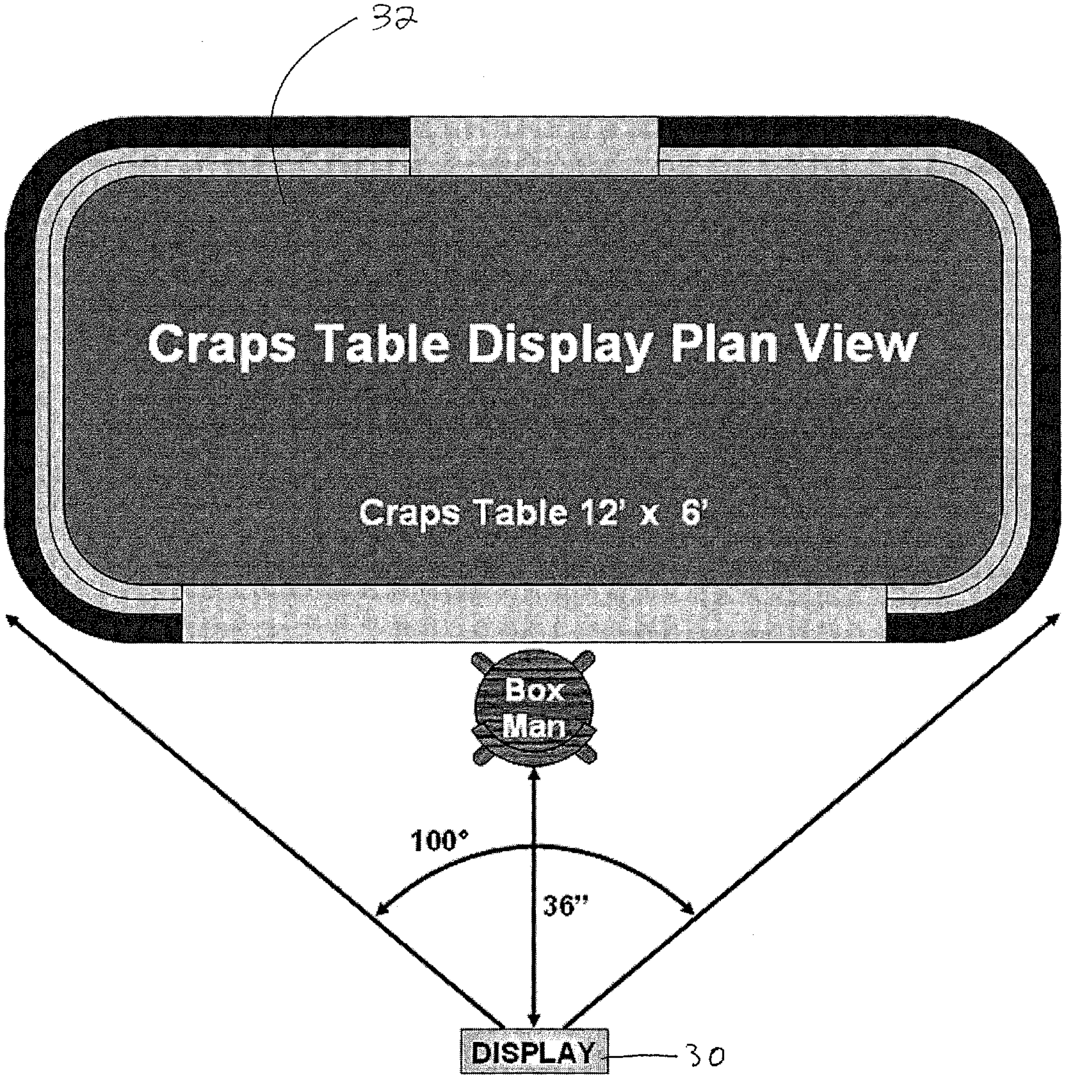
FIG. 15 illustrates another example of positioning a display behind the boxman, in accordance with one embodiment of the present invention.

FIG. 15 illustrates another example of positioning a display behind the boxman, in accordance with one embodiment of the present invention. For instance, in one example, the display can be positioned behind the boxman (i.e. approximately three feet behind the boxman) so as to create a wide viewing angle of the display (i.e., approximately 100 degree viewing angle). In this manner, the display can be seen by many of the players positioned about the craps table.

Hence, it can be seen that various embodiments of a craps table display 30 and related system are provided herein.

Embodiments of the invention can be implemented via appropriate software or computer program code instructions in combination with appropriate instruction execution platforms, processor(s), hardware or the like. These instructions may be in the form of a computer program product that can cause a CPU to control operation of a display according to an embodiment of the invention. The combination of hardware and software to perform the functions described can form the means to carry out the processes and/or subprocesses of embodiments of the invention. In this regard, each block in the flowcharts or block diagrams may represent a module, segment, action, or portion of code, which comprises one or more executable instructions or actions for implementing the specified logical function(s). Furthermore, an embodiment of the invention may take the form of a hardware embodiment, a software embodiment (including firmware, resident software, micro-code, etc.) or an embodiment combining software and hardware aspects.

Any suitable computer usable or computer readable medium may be used, taking into account that computer program code to operate a display according to embodiments of the invention may reside at various places during assembly of the display, in addition to on or within a display itself. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

In the context of this document, a computer usable or computer readable medium may be any medium that can contain, store, communicate, propagate, or transport the program for use by or in connection with an instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out embodiments of the present invention may be written in an object oriented, scripted or unscripted programming language such as but not limited to Java, Peri, Smalltalk, C++ or the like. However, the computer program code for carrying out embodiments of the present invention may also be written in conventional procedural programming languages, such as the "C" programming language or similar programming languages. It should also be noted that functions and combination of functions described herein can be implemented by special purpose hardware-based systems or operators which perform the specified functions or acts.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claimed inventions require more features than are expressly recited in each claim. Each embodiment described herein may contain more than one inventive feature.

While the invention has been particularly shown and described with reference to embodiments thereof, it will be understood by those skilled in the art that various other changes in the form and details may be made without departing from the spirit and scope of the invention.

The invention claimed is:

1. A method of displaying information related to a craps game played at a craps table, comprising:

providing a display associated with the craps table, the display operable to display at the same time at least two columns of previous die pairs rolled wherein the columns are of different sizes, the display having a first window in a dedicated first position which remains stationary in its location on the display and a second window in a dedicated second position which remains stationary in its location on the display, the second window being in a different location than the first window on the display, wherein the first window and the second window comprise individual displays capable of displaying in different dedicated positions a representation of data, the representation of data in each window comprising indicators of a snapshot of the craps game at a point in time including the die pair rolled by a shooter, the shooter, the point to be achieved by the shooter, and whether the shooter made the point;

obtaining data relating to a first die pair rolled by the shooter;

storing the data relating to the first die pair;

displaying in the first window on the display a representation of the data relating to the first die pair, wherein the representation of the data relating to the first die pair comprises indicators of a snapshot of the craps game at a first point in time including the first die pair rolled by the shooter at the first point in time, the shooter at the first point in time, a point to be achieved by the shooter at the first point in time, and whether the shooter made the point at the first point in time;

obtaining data relating to a second die pair rolled by the shooter;

storing the data relating to the second die pair;

moving the representation of the data relating to the first die pair to a second window on the display;

displaying in the first window on the display a representation of the data relating to the second die pair while at the same time displaying in the second window on the display the representation of the data relating to the first die pair, wherein the representation of the data relating to the second die pair comprises indicators of a snapshot of the craps game at a second point in time including the second die pair rolled by the shooter at the second point in time, the shooter at the second point in time, a point to be achieved by the shooter at the second point in time, and whether the shooter made the point at the second point in time.

2. The method of claim 1, wherein the representation of the data relating to the first die pair includes a graphic representation of the numeric value of each die of the first die pair.

3. The method of claim 1, wherein the representation of the data relating to the first die pair includes a graphic representation of the face of each die of the first die pair.

4. The method of claim 1, further comprising:

displaying on the display an indicator of a current point value of the craps game when one or more subsequent die pair rolls to a die pair roll establishing the current point value are made.

5. The method of claim 1, further comprising:

a dedicated point display window disposed in a separate location on the display from the first and second display windows which is operable to display one or more indicators of a current point value of the craps game;

displaying on the display one or more indicators indicating establishment of a point value, the one or more indicators displayed in addition to the displayed data relating to a die pair establishing the point value.

6. The method of claim 1, further comprising:

displaying on the display one or more indicators indicating a change in a shooter.

7. The method of claim 1, further comprising:

providing the representation of the data relating to the first die pair in a first color; and providing the representation of the data relating to the second die pair in a second color.

8. The method of claim 1, further comprising:

obtaining data relating to a third die pair rolled by the shooter;

storing the data relating to the third die pair;

moving the representation of data relating to the first die pair to a third window on the display, the third window on the display being in a dedicated third position which remains stationary in its location on the display and being in a different location than the first window and second window, the third window comprising an individual display capable of displaying a representation of data comprising indicators of a snapshot of the craps game at a point in time including the die pair rolled by the shooter, the shooter, the point to be achieved by the shooter, and whether the shooter made the point;

moving the representation of data relating to the second die pair to the second window on the display; and displaying in the first window on the display a representation of the data relating to the third die pair while at the same time displaying in the second window on the display the representation of data relating to the second die pair and in the third window on the display the representation of data relating to the first die pair.

9. The method of claim 1, wherein the display is operable to display at the same time at least three columns of representations of data relating to previous die pairs rolled, each column comprising a plurality of sequential dedicated windows, each of the plurality of sequential dedicated windows comprising an individual display capable of displaying a representation of data comprising indicators of a snapshot of the craps game at a point in time including the die pair rolled by the shooter of that die pair, the shooter of that die pair, the point to be achieved by the shooter of that die pair, and whether the shooter of that die pair made the point, wherein the columns are of different sizes.

10. The method of claim 9, wherein the at least three columns comprise a first column, a second column, and a third column, the first column operable to display in its plurality of sequential dedicated windows representations of data relating to die pairs more recently rolled by the die pair shooter than representations of data relating to die pairs which the second column is operable to display in its plurality of sequential dedicated windows, and the first column being larger in size than the second column.

11. The method of claim 10, wherein the second column is operable to display in its plurality of sequential dedicated windows representations of data relating to die pairs more recently rolled by the die pair shooter than representations of data relating to die pairs which the third column is operable to display display in its plurality of dedicated windows, the second column being larger in size than the third column.

12. The method of claim 1, wherein each of the at least two columns comprises a plurality of sequential dedicated windows permanently located in their respective positions on the display, each of the plurality of dedicated windows comprising an individual display capable of displaying a separate representation of data comprising indicators of a snapshot of the craps game at a point in time including the die pair rolled by the shooter of that die pair, the shooter of that die pair, the point to be achieved by the shooter of that die pair, and whether the shooter of that die pair made the point.

13. The method of claim 12, wherein the point in time in which the die pair rolled by the shooter occurred is different for each separate representation of data in each of the plurality of sequential dedicated windows when the information relating to the craps game is displayed at a single point in time.

14. A display for a craps table, comprising:

a first display window operable to display in a dedicated first position which remains stationary in its location on the display a representation of data relating to a current die pair rolled by a shooter, the representation of data relating to the current die pair rolled by the shooter comprising the current die pair rolled by the shooter at a current point in time, the shooter at the current point in time, a point to be achieved by the shooter at the current point in time, and whether the shooter made the point at the current point in time; and a second display window operable to display in a dedicated second position which remains stationary in its location on the display a representation of data relating to a previous die pairs rolled by the shooter, the representation of data relating to the previous die pair rolled by the shooter comprising the previous die pair rolled by the shooter at a previous point in time, the shooter at the previous point in time, the point to be achieved by the shooter at the previous point in time, and whether the shooter made the point at the previous point in time, wherein:

the first and second display windows are in different locations on the display and comprise individual displays capable of displaying in different dedicated positions representations of data, the representation of data relating to the current die pair rolled is capable of display in the first display window at the same time that the representation of data relating to the previous die pair rolled is displayed in the second display window, and the representation of data relating to the previous die pair rolled by the shooter is moveable from the first display window to the second display window when the current die pair is rolled.

15. The display of claim 14, wherein the representation of the data relating to the current die pair includes a graphic representation of the face of each die of the current die pair.

16. The display of claim 14, further comprising a dedicated point display window in a separate location on the display from the first and second display windows which is operable to display an indicator of a current point value of the craps game.

17. The display of claim 14, further comprising:

one or more indicators indicating a change in a shooter.

18. The display of claim 14, wherein the displayed representation of data relating to the current die pair rolled by a shooter is larger in size than the displayed representation of data relating to the previous die pairs rolled.

19. The display of claim 14, wherein the first display window is larger than the second display window.

20. The display of claim 14, wherein the first display window is permanently located in a position proximate a top of the display.

21. The display of claim 14, wherein the second display window is permanently located below the first display window on the display and wherein representations of data relating to additional previous die pairs rolled move sequentially from the first display window to the second display window.

22. The display of claim 14, wherein the first display window is permanently larger than the second display window.

23. The display of claim 14, further comprising a third display window operable to display in a dedicated third position which remains stationary in its location on the display a representation of data relating to an additional previous die pair rolled by the shooter, the representation of data relating to the additional previous die pair rolled by the shooter comprising the additional previous die pair rolled by the shooter at an additional previous point in time, the shooter at the additional previous point in time, the point to be achieved by the shooter at the additional previous point in time, and whether the shooter made the point at the additional previous point in time, wherein:

the third display window is permanently located in a different position on the display than the first and second display windows, the representation of data relating to the additional previous die pair rolled is capable of display in the third window at the same time that the representation of data relating to the previous die pair rolled is displayed in the second window, and the representation of data relating to the additional previous die pair rolled by the shooter is moveable from the second window to the third window when the current die pair is rolled.

24. The display of claim 14, wherein the display comprises at least three columns of display windows, each column comprising a plurality of sequential display windows, each of the plurality of sequential display windows operable to display in separate dedicated positions of permanent location on the display a representation of data relating to previous die pairs rolled at separate points in time by the shooters at the separate points in time, each representation of data relating to the previous die pairs rolled by the shooter at that separate point in time, the shooter at that separate point in time, a point to be achieved at that separate point in time, and whether the shooter made the point at that point in time.

25. The display of claim 24, wherein the display windows are operable to sequentially display at the same time in each separate window a representation of data relating to a separate previous die pair rolled at a separate previous point in time.

26. The display of claim 14, wherein the display comprises at least twenty-eight display windows, each display window operable to display in separate dedicated positions of permanent location on the display a representation of data relating to previous die pairs rolled at separate points in time by the shooters at the separate points in time, each representation of data relating to the previous die pairs rolled by the shooter at that separate point in time, the shooter at that separate point in time, a point to be achieved at that separate point in time, and whether the shooter made the point at that point in time.

27. The display of claim 26, wherein at the same time, each of the at least twenty-eight display windows is operable to display a sequential, separate representation of data relating to a separate previous die pair rolled at a previous point in time.

28. The display of claim 14, wherein a maximum number of display windows available for fit within a display size are disposed on the display, each display window permanently located in a dedicated position on the display and operable to display a representation of data relating to a die pair rolled by the shooter, the representation of data relating to the die pair rolled by the shooter comprising the die pair rolled by the shooter at a point in time, the shooter at the point in time, a point to be achieved by the shooter at the point in time, and whether the shooter made the point at the point in time, each point in time different for each display window.

29. A system for a craps table, comprising:

a keyboard operable to receive die pair data; and a display coupled with the keyboard, the display operable to display current and previous die pair data on the display at the same time using different display field sizes, the display comprising:

a first window operable to display in a dedicated first position which remains permanently in a first location on the display a representation of data relating to a current die pair rolled by a shooter, the representation of data relating to the current die pair rolled by the shooter comprising the current die pair rolled by the shooter at a current point in time, the shooter at the current point in time, a point to be achieved by the shooter at the current point in time, and whether the shooter made the point at the current point in time; and a second window operable to display in a dedicated second position which remains permanently in a second location on the display a representation of data relating to a previous die pairs rolled by the shooter, the representation of data relating to the previous die pair rolled by the shooter comprising the previous die pair rolled by the shooter at a previous point in time, the shooter at the previous point in time, the point to be achieved by the shooter at the previous point in time, and whether the shooter made the point at the previous point in time, wherein:

the first and second windows are in different locations on the display and comprise individual displays capable of displaying in different dedicated positions representations of data, the representation of data relating to the current die pair rolled is capable of display in the first window at the same time that the representation of data relating to the previous die pair rolled is displayed in the second window, and the representation of data relating to the previous die pair rolled by the shooter is moveable from the first window to the second window when the current die pair is rolled.

30. The system of claim 29, wherein the display of current and previous die pair data includes graphic representations of the faces of each die of the current and previous die pair data.

31. The system of claim 29, wherein the display includes a dedicated point display window operable to display an indicator of a current point value of the craps game, the dedicated point display window permanently separate in location from the first and second windows.

32. The method of claim 29, wherein the keyboard comprises a key for communicating to the display a new shooter.

33. The method of claim 32, further comprising displaying in the first window the shooter at the current point in time upon activation of the key for communicating to the display the new shooter.

* * * * *